United States Patent
Tu et al.

(10) Patent No.: US 8,700,687 B2
(45) Date of Patent: Apr. 15, 2014

(54) VIDEO CODEC AND METHOD THEREOF

(75) Inventors: Ying-Chieh Tu, Hsinchu Hsien (TW); Jin-Mu Wu, Hsinchu Hsien (TW); Yao-Hsin Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 520 days.

(21) Appl. No.: 13/026,396

(22) Filed: Feb. 14, 2011

(65) Prior Publication Data

US 2012/0016922 A1    Jan. 19, 2012

(30) Foreign Application Priority Data

Jul. 19, 2010    (TW) ................................ 99123693 A

(51) Int. Cl.
*G06F 17/14*        (2006.01)

(52) U.S. Cl.
USPC ........................................................ 708/402

(58) Field of Classification Search
None
See application file for complete search history.

(56) References Cited

U.S. PATENT DOCUMENTS

| | | | | |
|---|---|---|---|---|
| 6,907,438 | B1* | 6/2005 | Horton et al. | 708/402 |
| 6,990,506 | B2* | 1/2006 | Sun | 708/402 |
| 7,007,055 | B2* | 2/2006 | Zheltov et al. | 708/402 |
| 7,292,730 | B1* | 11/2007 | Lippincott | 382/233 |
| 7,634,525 | B2* | 12/2009 | Hou | 708/400 |
| 2003/0177158 | A1* | 9/2003 | Zheltov et al. | 708/402 |
| 2003/0206582 | A1* | 11/2003 | Srinivasan et al. | 375/240.01 |
| 2008/0273814 | A1* | 11/2008 | Mitchell et al. | 382/298 |
| 2012/0016922 | A1* | 1/2012 | Tu et al. | 708/402 |

* cited by examiner

*Primary Examiner* — David H Malzahn
(74) *Attorney, Agent, or Firm* — WPAT, PC; Justin King

(57) ABSTRACT

A video codec method is provided, for processing video data processed by a Discrete Cosine Transformation (DCT) operation, comprising: (a) if a transformation matrix having a plurality of coefficients comprises at least one non-integer coefficient among the coefficients, multiplying the transformation matrix by a multiplication factor $\alpha$ to make all coefficients of the transformation matrix integers, (b) estimating a compensation set, (c) performing a Column in Row out IDCT two-dimensional operation on the video data according to the transformation matrix and the compensation set, to obtain a compensated two-dimension operation result, (d) selectively dividing the compensated two-dimension operation result by $\alpha^2$ to obtain an IDCT operation result.

8 Claims, 3 Drawing Sheets

$$Y = T \cdot X \cdot T^t$$

$$\begin{bmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{bmatrix} = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \cdot \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \cdot \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

FIG. 6

$$Z = 2T \cdot X \cdot (2T)^t$$

$$\begin{bmatrix} Z_{00} & Z_{01} & Z_{02} & Z_{03} \\ Z_{10} & Z_{11} & Z_{12} & Z_{13} \\ Z_{20} & Z_{21} & Z_{22} & Z_{23} \\ Z_{30} & Z_{31} & Z_{32} & Z_{33} \end{bmatrix} = \begin{bmatrix} 2 & 2 & 2 & 1 \\ 2 & 1 & -2 & -2 \\ 2 & -1 & -2 & 2 \\ 2 & -2 & 2 & -1 \end{bmatrix} \cdot \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \cdot \begin{bmatrix} 2 & 2 & 2 & 2 \\ 2 & 1 & -1 & -2 \\ 2 & -2 & -2 & 2 \\ 1 & -2 & 2 & -1 \end{bmatrix}$$

FIG. 7

$$Z' = 2T \cdot X^t \cdot (2T)^t$$

$$\begin{bmatrix} Z'_{00} & Z'_{01} & Z'_{02} & Z'_{03} \\ Z'_{10} & Z'_{11} & Z'_{12} & Z'_{13} \\ Z'_{20} & Z'_{21} & Z'_{22} & Z'_{23} \\ Z'_{30} & Z'_{31} & Z'_{32} & Z'_{33} \end{bmatrix} = \begin{bmatrix} 2 & 2 & 2 & 1 \\ 2 & 1 & -2 & -2 \\ 2 & -1 & -2 & 2 \\ 2 & -2 & 2 & -1 \end{bmatrix} \cdot \begin{bmatrix} x_{00} & x_{10} & x_{20} & x_{30} \\ x_{01} & x_{11} & x_{21} & x_{31} \\ x_{02} & x_{12} & x_{22} & x_{32} \\ x_{03} & x_{13} & x_{23} & x_{33} \end{bmatrix} \cdot \begin{bmatrix} 2 & 2 & 2 & 2 \\ 2 & 1 & -1 & -2 \\ 2 & -2 & -2 & 2 \\ 1 & -2 & 2 & -1 \end{bmatrix}$$

VIDEO CODEC AND METHOD THEREOF

CROSS REFERENCE TO RELATED PATENT APPLICATION

This patent application is based on Taiwan, R.O.C. patent application No. 099123693 filed on Jul. 19, 2010.

FIELD OF THE INVENTION

The present invention relates to a video codec and method thereof.

BACKGROUND OF THE INVENTION

A conventional structure of a multimedia application, such as a video codec complying with H.264 specification, as shown in FIG. 1, includes a Discrete Cosine Transformation (DCT) operation circuit 110, a Quantization (Q) unit 120, an Inverse Quantization (IQ) unit 130, and an Inverse DCT (IDCT) operation circuit 140. The DCT operation circuit 110 acts in a Row in Column out (R→C) mode, and the IDCT operation circuit 140 also acts in a Row in Column out mode, and receives the output of the IQ unit 130.

In practice, the DCT operation circuit 110 and the IDCT operation circuit 140 must operate complying with a specification, otherwise mismatch between an encoding path and a decoding path will occur, resulting in a "drifting" effect during video playback. However, in some cases, the R→C operation of the IDCT operation circuit 140 is not straightforward in data flow, and a transposition is needed, accordingly. In addition, the prior art needs an extra buffer 135 to store data temporarily, for transforming Column data outputted from the DCT operation circuit 110 into Row data to be inputted to the IDCT operation circuit 140, thereby leading to both increases in processing time and cost of the video codec.

Therefore, an IDCT scheme for processing in a Column in Row out (C→R) mode, capable of real-time compensation, and requiring no extra buffer for temporarily storing data, so as to reduce processing time and cost in a video codec, is needed.

SUMMARY OF THE INVENTION

The present invention is aimed to provide a video codec and method thereof, capable of performing an IDCT in a Column in Row out (C→R) mode as well as real-time compensation.

According to one embodiment, a video codec method is provided, for processing video data processed by a Discrete Cosine Transformation (DCT) operation, including: (a) if a transformation matrix having a plurality of coefficients comprises at least one non-integer coefficient among the coefficients, multiplying the transformation matrix by a multiplication $\alpha$ to make all coefficients of the transformation matrix integers, (b) estimating a compensation set, (c) performing a Column in Row out IDCT two-dimensional operation on the video data according to the transformation matrix and the compensation set, to obtain a compensated two-dimension operation result, (d) selectively dividing the compensated two-dimension operation result by $\alpha^2$ to obtain an IDCT operation result.

According to another embodiment of the present invention, a video codec is provided, for processing video data processed by a Discrete Cosine Transformation (DCT) operation, including: a DCT operation circuit, for performing a Row in Column out IDCT operation on the video data, to obtain a DCT operation result, a quantization circuit and an inverse quantization circuit, coupled to the DCT operation circuit, for performing a quantization operation and an inverse quantization operation on the DCT operation result, an IDCT operation circuit, coupled to the inverse quantization circuit, for performing a Column in Row out IDCT operation on the output of the inverse quantization circuit to generate an IDCT operation result; and a compensation circuit, coupled to the IDCT operation circuit, for providing a compensation set to the IDCT operation circuit to compensate the IDCT operation result.

Following description and figures are disclosed to gain a better understanding of the advantages of the present invention.

BRIEF DESCRIPTION OF THE DRAWINGS

FIG. 6, FIG. 7 and FIG. 8 illustrate a two-dimensional IDCT transformation of a matrix, with a one-dimensional (1D) compensation set and a two-dimensional (2D) compensation set denoted respectively.

DETAILED DESCRIPTION OF THE PREFERRED EMBODIMENT

In an embodiment of the present invention, column data outputted from a DCT operation circuit is inputted to a Column in Row out IDCT operation circuit (i.e., an IDCT operation circuit acting in a Column in Row out mode); as a result, no additional buffer memory ahead of the IDCT operation circuit is needed. However, due to limitations of the number of bits, an operation result of the Column in Row out IDCT operation circuit may have some errors in response to an order inversion and round-off/carry-in operations. Thus, in the embodiment of the present invention, the errors are calculated in advance and corrected.

In mathematics theory (where the number of bits is unlimited), either the IDCT operation circuit acts in the Row in Column out mode or in the Column in Row out mode, the operation result should be identical. However, in practice, because the number of bits of the video codec is limited, if a fractional rounding operation is performed, the operation result of the Column in Row out IDCT operation circuit may be different from that of the Row in Column out IDCT operation circuit.

Figure 1:
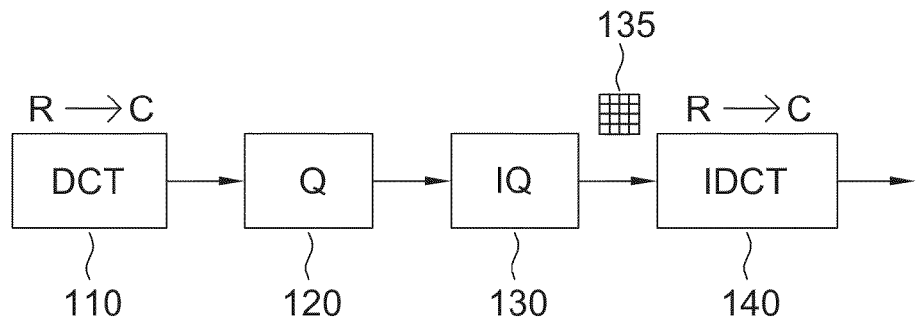
FIG. 1 is a schematic diagram of a video codec supporting the specification H.264 of the prior art.
Figure 2:
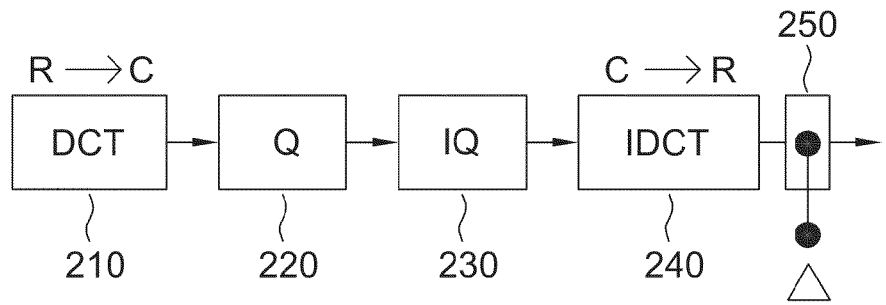
FIG. 2 is a schematic diagram of a video codec according to an embodiment of the present invention.

FIG. 2 is a function block diagram of a video codec according to an embodiment of the present invention. As shown in FIG. 2, the video codec comprises: a DCT operation circuit 210, a quantization unit 220, an inverse quantization unit 230, an IDCT operation circuit 240, and a compensation unit 250. The compensation unit 250 inducts a compensation set $\Delta$ to an output of the IDCT operation circuit 240, for obtaining a required correct result. Rounding mismatches resulted from an order inversion can be real-time corrected by utilizing the compensation unit 250, and circuit area of the compensation unit 250 is much less than that of the FIG. 1 required buffer 135.

In the H.264 specification, the two-dimensional (2D) IDCT transformation is defined as Y=T●X●T$^t$.

Figure 3A:
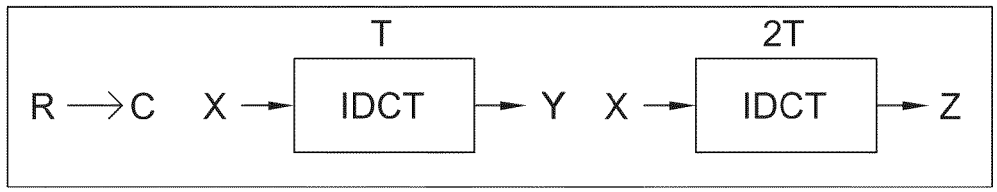
FIG. 3A and FIG. 3B are respectively schematic diagrams of a Row in Column out IDCT operation and a Column in Row out IDCT operation.
Figure 3B:
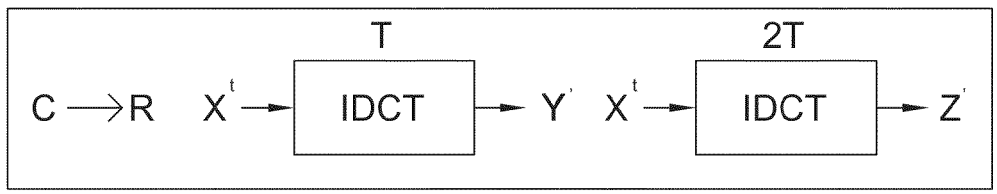

FIG. 3A and FIG. 3B respectively illustrate the Row in Column out (R→C) IDCT operation and the Column in Row out (C→R) IDCT operation. Y$^t$=(T●X●T$^t$)$^t$=T●X$^t$●T$^t$=Y'. In a floating-point operation in which the number of bits is unlimited, Y' is equal to the transposition result of Y. However, in a design in which the number of bits is limited, if a transformation matrix T has at least a non-integer coefficient (such as ½), fraction rounding effects resulted from the order inversion must be considered. A situation that the transformation matrix T has non-integer coefficients is shown as follows:

$$\begin{bmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{bmatrix}_Y = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix}_T \cdot$$

$$\begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}_X \cdot \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}_{T^t}$$

In this situation, Y' is not equal to the transposition result of Y (i.e., (Y$^t$!=Y$^t$)). That is to say, the transposition result of Y shown in FIG. 3A is not equal to Y' shown in FIG. 3B.

Therefore, in the embodiment, when the matrix input order is inverted from X to X$^t$, the following steps must be performed to correct the errors.

(1) Firstly, changing the non-integer coefficients of the transformation matrix into integer coefficients is performed. For example, in the above example, multiplying the transformation matrix T by 2, so that the coefficients (elements) of the obtained transformation matrix (2T) are all integers. Since the transformation matrix (2T) does not include any non-integer coefficients, no error occurs even when fraction rounding operations are performed. In regard to FIG. 3A and FIG. 3B, Z=(2T)●X●(2T)$^t$;

Z'=(2T)●X$^t$●(2T)$^t$;

and Z=(Z')$^t$.

(2) Since the number of bits is limited, in the embodiment, the compensation set Δ is calculated in advance, according to transpose symmetry and a rule of the rounding operation. Therefore, a compensated result is determined as Y''=(Z'+Δ)/4.

(3) The compensated result Y'' may be regarded as the transposition result of the matrix Y, as if it is the two-dimensional (2D) transformation result of the matrix X (that is, as if it is the result obtained by the Row in Column out IDCT). Therefore, the relationship between the matrix Y'' and the matrix Y may be expressed as Y=(Y'')$^t$.

Calculation of the compensation set Δ is depicted as follows.

In a fixed-point design, the result of right shifting the number X by one bit (that is, dividing the number X by 2 if the number X is expressed in binary) is equal to the result of subtracting the Least Significant Bit (LSB) thereof from the number X and then dividing it by 2. It can be expressed as following equation (a):

$$X_{>>1} = \tfrac{1}{2} X = \tfrac{1}{2}(X - X[0]) \tag{a}$$

Wherein, "X>>1" represents right shifting X by one bit, and X[0] represents the LSB of the number X.

In H.264 specification, the two-dimensional transformation of the Row in Column out IDCT is defined as Y=T●X●T$^t$.

Likewise, the two-dimensional transformation of the Column in Row out IDCT is defined as Y'=T●X$^t$●T$^t$.

Using the coefficient Y$_{01}$ of the above matrix Y as an example, as shown in FIG. 6.

As in FIG. 6, a one-dimensional (1D) compensation set and a two-dimensional (2D) compensation set are denoted respectively. The 1D compensation set and the 2D compensation set respectively include a set of coefficients of the matrix Y. The coefficient Y$_{01}$ can be expressed as:

$$Y_{01} = x_{00} + x_{10} + x_{20} + 1/2 x_{30} + (x_{01} + x_{11} + x_{21} + 1/2 x_{31})(1/2) +$$
$$(x_{02} + x_{12} + x_{22} + 1/2 x_{32})(-1) + (x_{03} + x_{13} + x_{23} + 1/2 x_{33})(-1)$$

Wherein, italic items belong to the 1D compensation set and boldface items belong to the 2D compensation set. After substituting the equation (a) into the 1D compensation set of the Y$_{01}$ (i.e. ½X$_{30}$, ½X$_{31}$, ½X$_{32}$, ½X$_{33}$), the Y$_{01}$ may be expressed as a combination of equations (b)~(e):

$$Y_{01} = x_{00} + x_{10} + x_{20} + 1/2[x_{30} - x_{30}[0]] + \tag{b}$$
$$(x_{01} + x_{11} + x_{21} + 1/2[x_{31} - x_{31}[0]])(1/2) + \tag{c}$$
$$(x_{02} + x_{12} + x_{22} + 1/2[x_{32} - x_{32}[0]])(-1) + \tag{d}$$
$$(x_{03} + x_{13} + x_{23} + 1/2[x_{33} - x_{33}[0]])(-1) \tag{e}$$

When substituting equation (a) into equation (c) again, and simplifying the LSB of the 2D compensation set (X$_{01}$+X$_{11}$+X$_{21}$+(½) X$_{31}$) in equation (c) as X01[0] ^X11[0]^X21[0] ^X31[1], Y$_{01}$ may be expressed as follows:

$$Y_{01} = x_{00} + x_{10} + x_{20} + 1/2[x_{30} - x_{30}[0]] + \tag{f}$$
$$(x_{01} + x_{11} + x_{21} + 1/2[x_{31} - x_{31}[0]] - x_{01}[0]\wedge x_{11}[0]\wedge x_{21}[0]\wedge x_{31}[1])$$
$$(1/2) + (x_{02} + x_{12} + x_{22} + 1/2[x_{32} - x_{32}[0]])(-1) +$$
$$(x_{03} + x_{13} + x_{23} + 1/2[x_{33} - x_{33}[0]])(-1)$$

As Z is defined as Z=(2 T)●X●(2T)$^t$, Z has no rounding effects, because the transformation matrix (2T) has no non-integer coefficients.

As shown in FIG. 7, the coefficient Z$_{01}$ of the matrix Z may be expressed as:

$$Z_{01} = 4x_{00} + 4x_{10} + 4x_{20} + 2x_{30} + 2x_{01} + 2x_{11} + 2x_{21} +$$
$$x_{31} - 4x_{02} - 4x_{12} - 4x_{22} - 2x_{32} - 4x_{03} - 4x_{13} - 4x_{23} - 2x_{33}$$

As Z' is defined as Z'=(2T)●X$^t$●(2T)$^t$, Z' also has no rounding effects, because the transformation matrix (2T) has no non-integer coefficients, either.

As shown in FIG. 8, by comparison, it can be determined that $Z'_{10}$ is equal to $Z_{01}$ (i.e. $Z'=Z^t$).

$$Z'_{10} = 4x_{00} + 4x_{10} + 4x_{20} + 2x_{30} +$$
$$2x_{01} + 2x_{11} + 2x_{21} + x_{31} -$$
$$4x_{02} - 4x_{12} - 4x_{22} - 2x_{32} -$$
$$4x_{03} - 4x_{13} - 4x_{23} - 2x_{33}$$
$$= Z_{01}$$

After scaling up the matrix Y by 4 times, the relationship between $Y_{10}$ and $Z'_{10}$ may be expressed as:

$$4Y_{01} = 4x_{00} + 4x_{10} + 4x_{20} + 2[x_{30} - x_{30}[0]] +$$
$$(2x_{01} + 2x_{11} + 2x_{21} + 1[x_{31} - x_{31}[0]] - 2x_{01}[0]^\wedge x_{11}[0]^\wedge x_{21}[0]^\wedge x_{31}[1]) -$$
$$(4x_{02} + 4x_{12} + 4x_{22} + 2[x_{32} - x_{32}[0]]) -$$
$$(4x_{03} + 4x_{13} + 4x_{23} + 2[x_{33} - x_{33}[0]])$$
$$= 4x_{00} + 4x_{10} + 4x_{20} + 2x_{30} - 2x_{30}[0] +$$
$$2x_{01} + 2x_{11} + 2x_{21} + x_{31} - x_{31}[0] - -2x_{01}[0]^\wedge x_{11}[0]^\wedge x_{21}[0]^\wedge x_{31}[1]$$
$$4x_{02} - 4x_{12} - 4x_{22} - 2x_{32} + 2x_{32}[0] -$$
$$4x_{03} - 4x_{13} - 4x_{23} - 2x_{33} + 2x_{33}[0]$$
$$= z'_{10} + (-2x_{30}[0] - x_{31}[0] + 2x_{32}[0] + 2x_{33}[0]) +$$
$$(-2x_{01}[0]^\wedge x_{11}[0]^\wedge x_{21}[0]^\wedge x_{31}[1])$$

In the above expression, $(-2X_{30}[0]-X_{31}[0]+2X_{32}[0]+2X_{33}[0])$ represents the 1D compensation set, and $(-2X_{01}[0]\char94 X_{11}[0]\char94 X_{21}[0]\char94 X_{31}[0])$ represents the 2D compensation set.

As described above, the following steps, concluded from the above, are utilized for compensation of mismatch resulted from the order inversion (i.e. changing the IDCT from the Row in Column out mode to the Column in Row out mode).

(1) Changing non-integer coefficients of the transformation matrix into integer coefficients is performed. For example, in the above example, multiplying the transformation matrix by 2, such that the coefficients of the obtained transformation matrix are all integers. Therefore, no errors occur even when fractional rounding operations are performed.

$$Z=(2T)\bullet X\bullet(2T)^t;$$

$$Z'=(2T)\bullet X^t\bullet(2T)^t;$$

and $Z=(Z')^t$.

(2) Since the number of bits is limited, calculating the compensation set Δ in advance (according to transpose symmetry and the rule of the rounding operation) is performed. Then, the compensated result is determined to be $Y''=(Z'+\Delta)/4$.

(3) The compensated result Y" may be regarded as the transposition result of the matrix Y, as if it is the two-dimensional (2D) transformation result of the matrix X (that is, as if it is the result obtained by the Row in Column out IDCT). Therefore, the relationship between the matrix Y" and the matrix Y may be expressed as $Y=(Y'')^t$. That is, $Y=(Z'+\Delta\_1D+\Delta\_2D)^t/4=(Z'+\Delta)^t/4$, wherein, Δ_1D represents the one-dimensional compensation set, and Δ_2D represents the two-dimensional compensation set.

Figure 4:
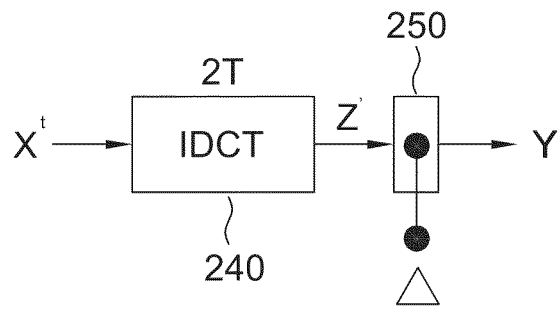
FIG. 4 illustrates an operation result of an IDCT operation circuit and a compensation unit, taking a matrix $X^t$ as an input matrix.

Referring to FIG. 4, taking the matrix $X^t$ as an input matrix, the IDCT operation circuit performs the operation of $Z'=(2T)\bullet X^t\bullet(2T)^t$, for obtaining Z'. Subsequently, after performing the compensation (adding Δ and being divided by 4) and the transposition, the matrix Y can be obtained. That is to say, $Y=((Z'+\Delta)/4)^t$. This operation is performed by the compensation unit.

With the above deducing process, it can be concluded that the one-dimensional compensation set (may be named as Δ_1D or 1D-term) and the two-dimensional compensation set (may be named as Δ_2D or 2D-term) are respectively expressed as follows:

$$1D\text{-term} = \begin{bmatrix} -2x_{30}[0] - 2x_{31}[0] - 2x_{32}[0] - x_{33}[0] & \ldots & \ldots & \ldots \\ -2x_{30}[0] - x_{31}[0] + 2x_{32}[0] + 2x_{33}[0] & \ldots & \ldots & \ldots \\ -2x_{30}[0] + x_{31}[0] + 2x_{32}[0] - 2x_{33}[0] & \ldots & \ldots & \ldots \\ -2x_{30}[0] + 2x_{31}[0] - 2x_{32}[0] + x_{33}[0] & \ldots & \ldots & \ldots \end{bmatrix}$$

$$2D\text{-term} = \begin{bmatrix} -2x_{03}[0]\char94 x_{13}[0]\char94 x_{23}[0]\char94 x_{33}[1] & \ldots & \ldots & \ldots \\ -2x_{01}[0]\char94 x_{11}[0]\char94 x_{21}[0]\char94 x_{31}[1] & \ldots & \ldots & \ldots \\ +2x_{01}[0]\char94 x_{11}[0]\char94 x_{21}[0]\char94 x_{31}[1] & \ldots & \ldots & \ldots \\ +2x_{03}[0]\char94 x_{13}[0]\char94 x_{23}[0]\char94 x_{33}[1] & \ldots & \ldots & \ldots \end{bmatrix}$$

$1D\text{-}term_{00} = -2x_{30}[0] - 2x_{31}[0] - 2x_{32}[0] - x_{33}[0]$ $1D\text{-}term_{10} = -2x_{30}[0] - x_{31}[0] + 2x_{32}[0] + 2x_{33}[0]$ $1D\text{-}term_{20} = -2x_{30}[0] + x_{31}[0] + 2x_{32}[0] - 2x_{33}[0]$ $1D\text{-}term_{30} = -2x_{30}[0] + 2x_{31}[0] - 2x_{32}[0] + x_{33}[0]$

...

...

...

...

$2D\text{-}term_{00} = -2x_{03}[0]\char94 x_{13}[0]\char94 x_{23}[0]\char94 x_{33}[1]$ $2D\text{-}term_{10} = -2x_{01}[0]\char94 x_{11}[0]\char94 x_{21}[0]\char94 x_{31}[1]$ $2D\text{-}term_{20} = +2x01[0]\char94 x_{11}[0]\char94 x_{21}[0]\char94 x_{31}[1]$ $2D\text{-}term_{30} = +2x_{03}[0]\char94 x_{13}[0]\char94 x_{23}[0]\char94 x_{33}[1]$

...

...

...

...

Figure 5A:
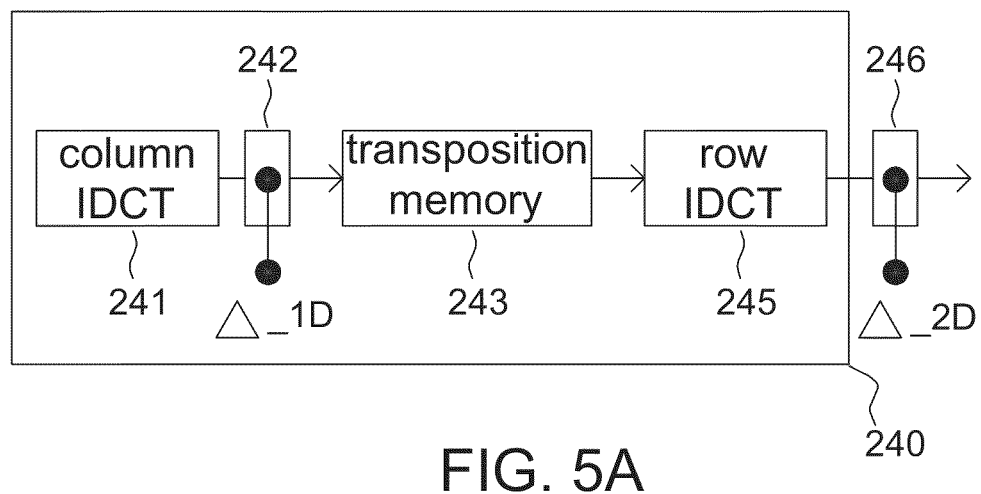
FIG. 5A and FIG. 5B respectively illustrate two possible embodiments of the IDCT operation circuit in FIG. 2 according to an embodiment of the present invention.
Figure 5B:
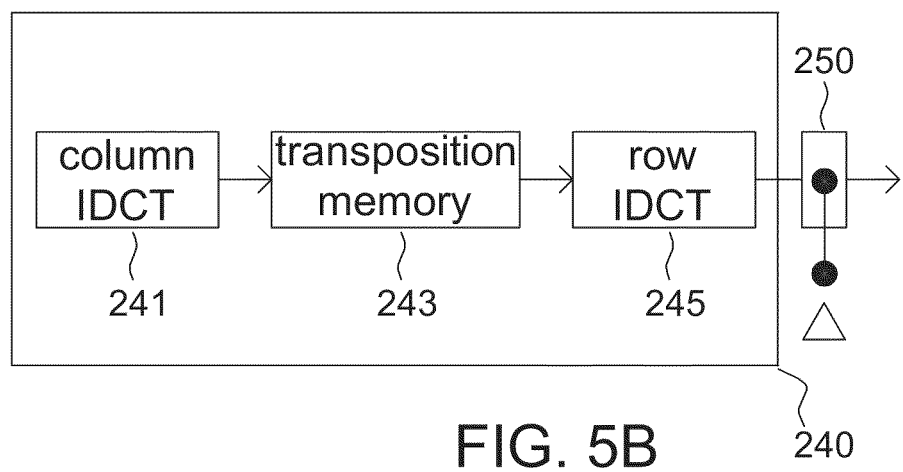

FIG. 5A and FIG. 5B respectively illustrate two possible implementations of the IDCT operation circuit 240 according to embodiments of the present invention. In FIG. 5A, the compensation unit 242 performs a one-dimensional compensation set compensation operation on the output of the column IDCT operation circuit 241, and the compensation unit 246 performs a two-dimensional compensation set compensation operation on the output of the row IDCT operation circuit 245. A transposition memory 243 is disposed between the column IDCT operation circuit 241 and the row IDCT operation circuit 245. From the above descriptions, the detail operations of the column IDCT operation circuit 241 and the row IDCT operation circuit 245 are familiar to those skilled in the art, and are omitted herein.

As shown in FIG. 5B, the compensation unit 250 performs the one-dimensional compensation set compensation operation and the two-dimensional compensation set compensation operation on the output of the Row IDCT operation circuit 245 directly. The 1D-term and 2D-term listed in the above equations may respectively represent the one-dimensional compensation set and the two-dimensional compensation set in FIG. 5B. The one-dimensional compensation set $\Delta\_1D$ and the two-dimensional compensation set $\Delta\_2D$ in FIG. 5A can be deduced from the above descriptions by those skilled in the art, and the detailed descriptions are omitted herein.

Although the compensation set is calculated by the above expressions, in other specifications, different transformation matrixes may be adopted. According to the above descriptions of the present invention, as to different specifications and different transformation matrixes, the present invention is also applicable. That is, changing all of the non-integer coefficients of the transformation matrix into integer coefficients (such as scaling up) for avoiding the mismatch resulted from a fixed-point calculation. Then, substituting compensation sets into the matrix according to the rounding operating principle and the transposing principle. Afterwards, transposing the matrix obtained by scaling down an operation result of the above steps, so as to acquire a required correct result.

In addition, although the above embodiment takes multiplying the transformation matrix by 2 as an example, the present invention is not limited to this. In other possible embodiments of the present invention, it can multiply all of the coefficients of the transformation matrix by $\alpha$, such that all coefficients are integers, and divide the operation result by $\alpha^2$.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory computer-readable storage medium with an executable program stored thereon, wherein the program instructs a microprocessor to perform the following steps:
    (a) determining if a transformation matrix having a plurality of coefficients comprises at least one non-integer coefficient among the coefficients, multiplying the transformation matrix by a multiplication factor $\alpha$ to make all coefficients of the transformation matrix integers;
    (b) estimating a compensation;
    (c) performing a Column in Row out IDCT two-dimensional operation on the video data according to the transformation matrix and the compensation set, to obtain a compensated two-dimension operation result; and
    (d) selectively dividing the compensated two-dimension operation result by $\alpha^2$ to obtain an IDCT operation result.

2. The non-transitory computer-readable storage medium of claim 1, wherein step of selectively dividing the compensated two-dimension operation result by $\alpha^2$ to obtain an IDCT operation result comprises:
    if the transformation matrix is multiplied in the step (a), dividing the compensated two-dimension operation result by $\alpha^2$ to obtain an IDCT operation result; and
    if the transformation matrix is not multiplied in the step (a), applying the compensated two-dimension operation result as the IDCT operation result.

3. The non-transitory computer-readable storage medium of claim 1, wherein the compensation set comprises a one-dimension compensation set and a two-dimension compensation set, the step (c) comprises:
    performing the Column in Row out IDCT two-dimensional operation according to the transformation matrix without the compensation set, to obtain an uncompensated two-dimension operation result; and
    performing a compensation of the one-dimension compensation set and that of the two-dimension compensation set on the uncompensated two-dimension operation result, to obtain the compensated two-dimension operation result.

4. The non-transitory computer-readable storage medium of claim 1, wherein the compensation set comprises a one-dimension compensation set and a two-dimension compensation set, the step (c) comprises:
    performing a column IDCT operation on the video data to obtain a column IDCT operation result;
    performing a compensation of the one-dimension compensation set on the column IDCT operation result, to obtain a compensated column IDCT operation result;
    performing a row IDCT operation on the compensated column IDCT operation result, to obtain a row IDCT operation result; and
    performing a compensation of the two-dimension compensation set on the row IDCT operation result, to obtain the compensated two-dimension operation result.

5. A video codec, for processing video data processed by a Discrete Cosine Transformation (DCT) operation, comprising:
    a DCT operation circuit, for performing a Row in Column out IDCT operation on the video data, to obtain a DCT operation result;
    a quantization circuit and an inverse quantization circuit, coupled to the DCT operation circuit, for performing a quantization operation and an inverse quantization operation on the DCT operation result;
    an IDCT operation circuit, coupled to the inverse quantization circuit, for performing a Column in Row out IDCT operation on the output of the inverse quantization circuit to generate an IDCT operation result; and
    a compensation circuit, coupled to the IDCT operation circuit, for providing a compensation set to the IDCT operation circuit to compensate the IDCT operation result.

6. The video codec of claim 5, wherein the compensation set comprises a one-dimension compensation set and a two-dimension compensation set, the compensation circuit performs a compensation of the one-dimension compensation set and that of the two-dimension compensation set on the output of the IDCT operation circuit, to obtain the IDCT operation result.

7. The video codec of claim 5, wherein the IDCT operation circuit comprises a column IDCT operation unit and a row IDCT operation unit, the compensation circuit comprises a first compensation unit and a second compensation unit, the compensation set comprises a one-dimension compensation set and a two-dimension compensation set.

8. The video codec of claim 7, wherein:
    the column IDCT operation unit performs a column IDCT operation on the video data to obtain a column IDCT operation result;
    the first compensation unit is coupled to the column IDCT operation unit, for performing a compensation of the one-dimension compensation set on the column IDCT operation result, to obtain a compensated column IDCT operation result;

the row IDCT operation unit performs a row IDCT operation on the compensated column IDCT operation result, to obtain a row IDCT operation result; and the second compensation unit is coupled to the row IDCT operation unit, for performing a compensation of the two-dimension compensation set on the row IDCT operation result, to obtain the compensated two-dimension operation result.

* * * * *